United States Patent [19]

Johnson

[11] Patent Number: 4,692,362
[45] Date of Patent: Sep. 8, 1987

[54] FABRIC REINFORCED TUBULAR RUBBER BLADDERS AND METHOD OF MAKING SAME

[75] Inventor: James L. Johnson, Johnson City, Tenn.

[73] Assignee: McCreary Industrial Products Co., Piney Flats, Tenn.

[21] Appl. No.: 843,583

[22] Filed: Mar. 25, 1986

[51] Int. Cl.$^4$ .................. B65D 35/02; B60T 11/10; B32B 7/14
[52] U.S. Cl. ............................ 428/35; 428/124; 156/156; 156/198; 156/215; 156/227; 156/245; 188/151 R
[58] Field of Search ................. 277/34, 34.3; 156/401; 428/36, 35, 124; 138/93; 156/198, 156, 227, 215, 245; 188/151 R

[56] References Cited
U.S. PATENT DOCUMENTS

| | | | |
|---|---|---|---|
| 3,940,152 | 2/1976 | Fournier | 277/34 |
| 4,079,755 | 3/1978 | Van der Lans | 138/93 |
| 4,199,393 | 4/1980 | Brown et al. | 156/401 |
| 4,243,451 | 1/1981 | Kortman | 156/401 |
| 4,310,161 | 1/1982 | Streich | 277/34 |

Primary Examiner—John E. Kittle
Assistant Examiner—James J. Seidleck
Attorney, Agent, or Firm—Walter J. Blenko, Jr.

[57] ABSTRACT

The two halves of a split annular inflatable brake are formed by laying up a number of flat rubber body plies and interleaved end patches which extend longitudinally beyond the ends of the body plies. The sides of the body plies, some of which are fabric reinforced, are successively folded over each other and stitched to form a multi-layered flattened tubular body. The end patches are folded in turn over the ends of the flattened tubular body, and in the case of fabric reinforced patches, are pinched and trimmed along the side edges of the flattened tubular body. Unreinforced end patches are cut inward from the sides to form a center flap which is folded down against the sides of the flattened tubular body and side flaps, one of which is removed, and the other of which is pulled circumferentially around the tubular body over the folded center flap. The split air brake is built up on an arcuate mold half and then the remaining mold parts are assembled around the built up part for curing.

25 Claims, 36 Drawing Figures

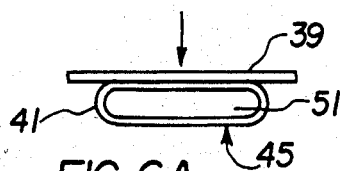
FIG.6A  FIG.7A
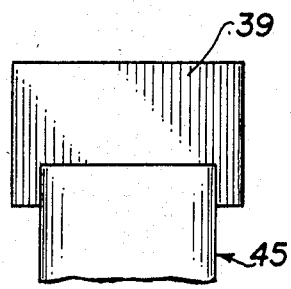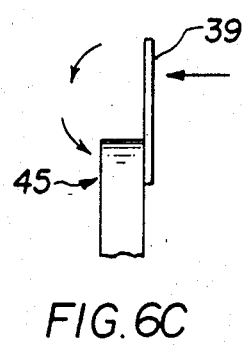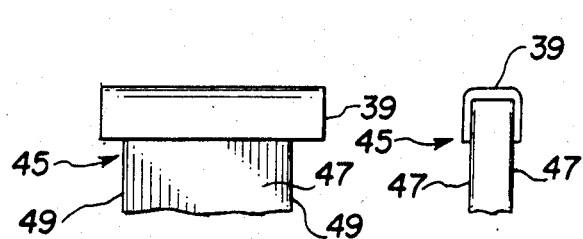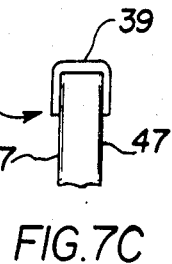
FIG.6B  FIG.6C  FIG.7B  FIG.7C
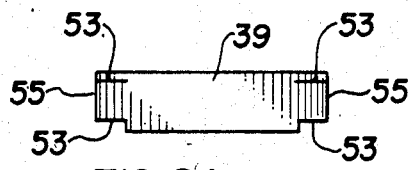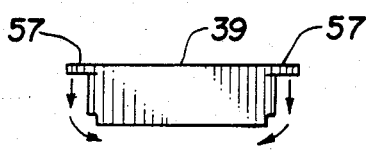
FIG.8A  FIG.9A
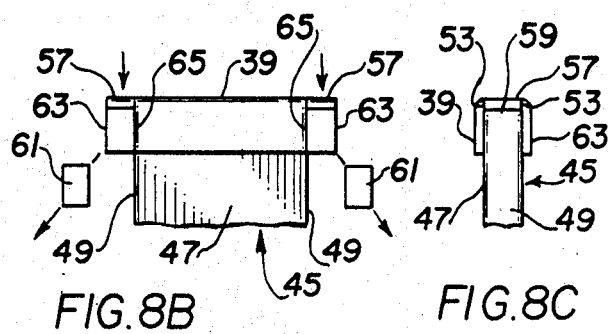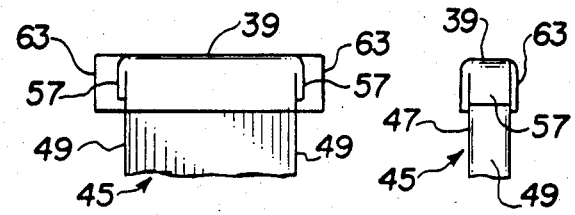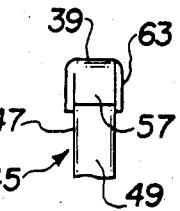
FIG.8B  FIG.8C  FIG.9B  FIG.9C
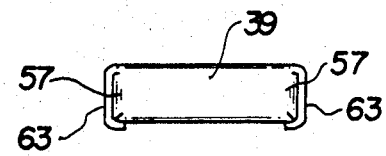
FIG. 10
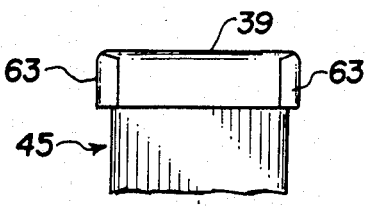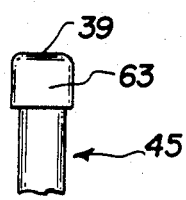
FIG. 10B  FIG. 10C

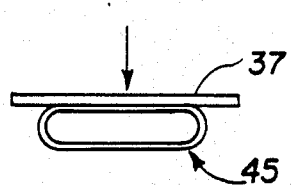
FIG. 11A
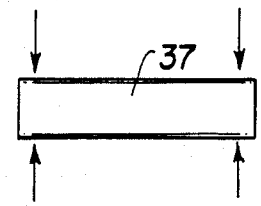
FIG. 12A
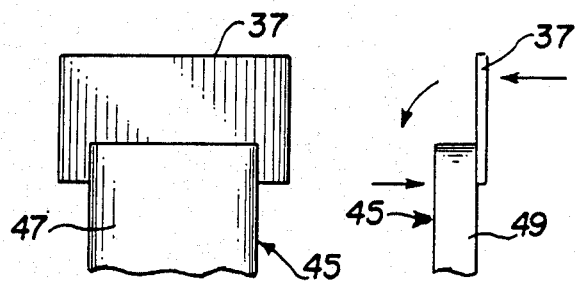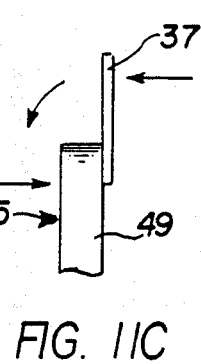
FIG. 11B   FIG. 11C
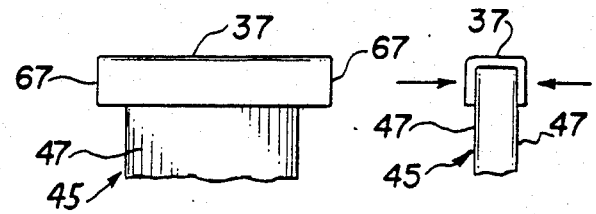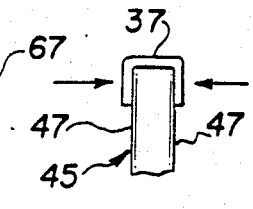
FIG. 12B   FIG. 12C
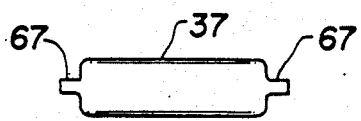
FIG. 13A
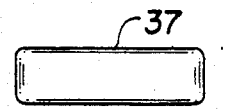
FIG. 14A
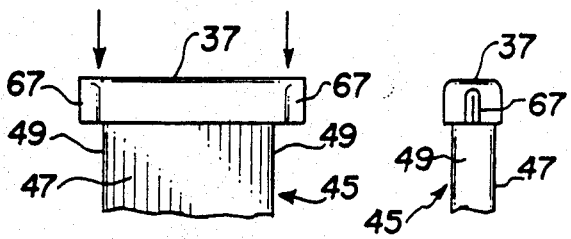
FIG. 13B   FIG. 13C
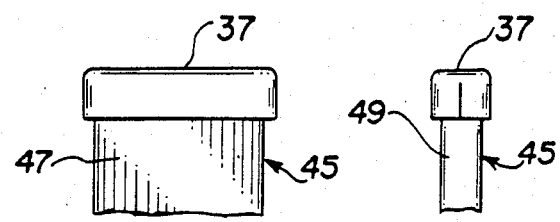
FIG. 14B   FIG. 14C

FABRIC REINFORCED TUBULAR RUBBER BLADDERS AND METHOD OF MAKING SAME

BACKGROUND OF THE INVENTION

1. Field of the Invention

This invention relates to tubular inflatable bladders constructed of multiple plies of rubber and fabric reinforced rubber, and to a method of making the same. In particular, the end construction of such bladders and the method of sealing the ends, and has particular application to the construction of two part, annular inflatable brakes and clutches.

2. Prior Art

A type of brake, used for instance on tire building machines, comprises an inflatable, annular bladder which surrounds a rotatable shaft. The bladder is built up from several layers of flat rubber sheets, some of which are fabric reinforced, folded to form a multiple ply torroid which is flattened in the radial direction. The bladder is contained within a rigid ring such that introduction of compressed air into the bladder causes it to expand radially inward against the shaft to generate a braking force.

This type of brake only has one moving part, the expandable bladder. It adjusts readily to minor misalignments and to wear, needs little attention, and is easily controlled. This type of device is also useful as a clutch for selectively coupling the shaft to another rotating part such as a drum.

One difficulty with this type of brake when used on a tire building machine is that the entire drum shaft must be pulled in order to change a leaking brake. This requires a good deal of down time, and a time consuming "dial-in" after the drum has been reinstalled.

SUMMARY OF THE INVENTION

According to the invention, an air brake or clutch of the type which surrounds a shaft is constructed of two semi-circular halves such that each half may be separately replaced without requiring removal of the shaft. The two halves comprise arcuate, flattened tubular bladders with closed ends. They are constructed by laying up layers of flat body plies, some of rubber and some of fabric reinforced rubber, and inserting between the ends of the body plies, end patches which extend longitudinally beyond the body plies. The sides of the topmost body ply are folded over and secured to one another to form a flattened tubular body having two flat sides and round side edges. The patches are folded separately over the open end of, and against the flat sides of, the flattened tubular body. The sides of the folded pathes are then plied around the rounded side edges of the flattened tubular body. Each of the body plies and end patches is folded in succession in a similar manner.

End patches which are fabric reinforced are folded substantially in half over the end of the flattened tubular body with each half folded flat against a flat side thereof. These patches are of such a width that they extend laterally beyond each rounded side edge of the flattened tubular body. These extended portions of the fabric reinforced patch are pinched together and trimmed off along the rounded side edges of the flattened tubular body so that there is no bulky overlapping of the reinforced patch.

Unreinforced rubber end patches are also folded substantially in half over the end of the flattened tubular body with each half folded flat against one flat side. Again these patches are wider than the flattened tubular body and extend laterally beyond each of the rounded side edges. The sides are plied by making two cuts inward from each side edge of the patch, each one in alignment with one end of a flat side on the flattened tubular body. These cuts form, at each side of the patch, a center flap parallel to the plane of the end of the flattened tubular body, and two side flaps, each adjacent and parallel to one of the flat sides. One of the two side flaps at each side of the path is removed. The center flap is folded such that it extends longitudinally along the adjacent rounded side edge of the flattened tubular body. The remaining side flap is folded circumferentially around the tubular body over the folded center flap.

The unreinforced rubber patches form the inner ply of the end seal for the flat tubular body and the outer covering. The fabric reinforced rubber patches form intermediate plies which add strength to the end seal. When cured, the multiple plies of the tubular body and the patches bond to form an integral structure. The manner in which the patches are applied provides an end seal which can withstand the pressures generated in the tubular body without undue bulk which would make it difficult to insert the device into a mold for curing.

In a preferred form of the invention, a first flat body ply, a second flat body ply, a first pair of end patches, a third body ply, a second pair of end patches, a third pair of end patches and a fourth ply are laid up with the patches in each pair extending longitudinally outward beyond the ends of the body plies. The sides of the fourth ply are folded inward and secured together to form the open ended flattened tubular body. The third pair of end patches, which are unreinforced rubber, are folded longitudinally over the open end of the flattened tubular body formed by the fourth ply and the sides are plied as described above for the unreinforced rubber patches. The second pair of patches which are fabric reinforced, are then folded and the sides plied as also described above. The third body ply, which is preferably fabric reinforced, is then folded around the fourth ply and over the folded halves of the second and third end patches to add a layer to the tubular body. Next, the first pair of end patches, also fabric reinforced, are folded and the sides plied as described for reinforced patches. The second ply, which is preferably fabric reinforced with the cords set at an angle to the cords of the third ply, and the first ply, which is unreinforced rubber, are separately folded around the third ply and over the folded first pair of end patches to form the two outer layers of the tubular body.

In laying up the body plies and end patches, the first body ply is secured along a center portion to rubber lugs formed in an arcuate mold half which curves in a plane transverse to the planes of the flat sides of the flattened tubular body formed by the body plies. After the bladder construction has been completed as described above, the remainder of the mold, including rubber mold inserts, is assembled around the bladder, which is filled with a pressurized fluid, such as compressed air, to fill out the mold, and head is applied to cure the rubber which bonds the various plies and end patches to form an integral, semi-circular flattened tubular brake or clutch member. Two such half members are used together to form a complete brake or clutch.

Only a half that is leaking need be replaced and it does not require removing the entire drum shaft in the case of a tire building machine.

It has been found that it is very important that the fabric reinforced end patches be folded and the sides pinched and trimmed as described, and that a body ply then be wrapped around the folded patches, to provide the strength required, yet minimize the bulk so that the structure can be inserted into the molded without damaging it and also to provide an end seal which is flexible.

The invention embraces both the bladder and the method of making it and the invention may be applied to flattened tubular bladders for other purposes than air brakes or clutches and to the method of making the same.

BRIEF DESCRIPTION OF THE DRAWINGS

A full understanding of the invention can be gained from the following description when read in conjunction with the accompanying drawings in which:

FIGS. 6 through 10 illustrate schematically the steps by which the unreinforced rubber end patches are integrated into the split air brake, with the "a", "b" and "c" views in each figure showing an end, front and side view respectively at each step;

FIGS. 11 through 14 illustrate schematically the steps by which the fabric reinforced end patches are built into the split air brake, again with the "a", "b" and "c" views in each figure showing an end, front and side view respectively at each step;

DESCRIPTION OF THE PREFERRED EMBODIMENT

The invention will be described as applied to a two-piece air brake used on the shaft of a tire building machine; however, it should be recognized that the invention has application to reinforced, flattened tubular bladders, sealed on the end, suitable for other purposes.

Figure 1:
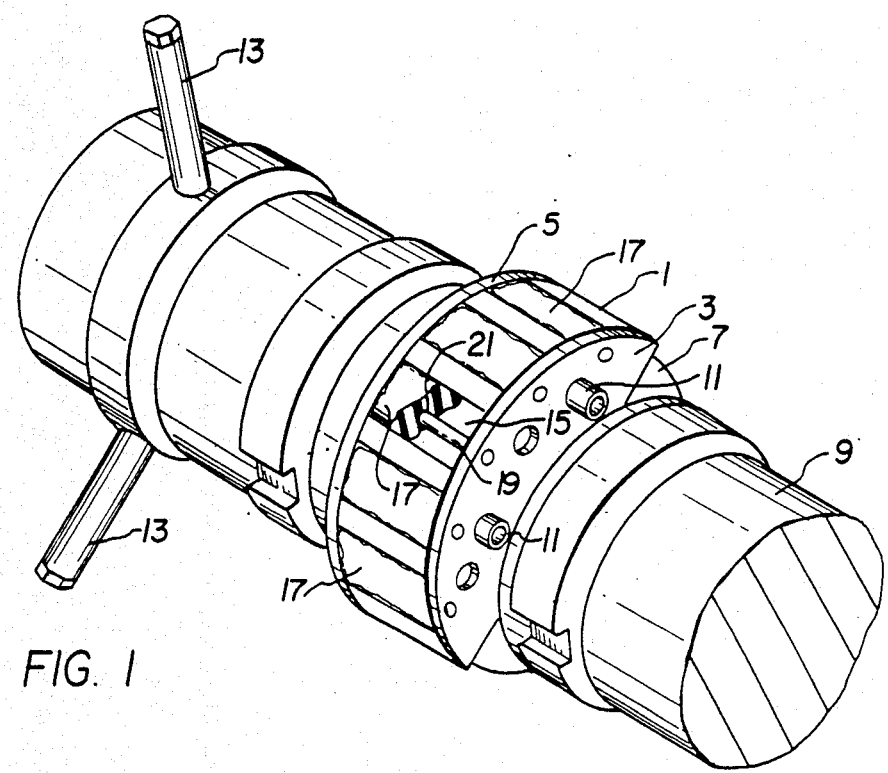
FIG. 1 is an isometric view of a mold half in place on the shaft of a bladder building machine ready for construction of a split air brake in accordance with the teachings of the invention.
Figure 2:
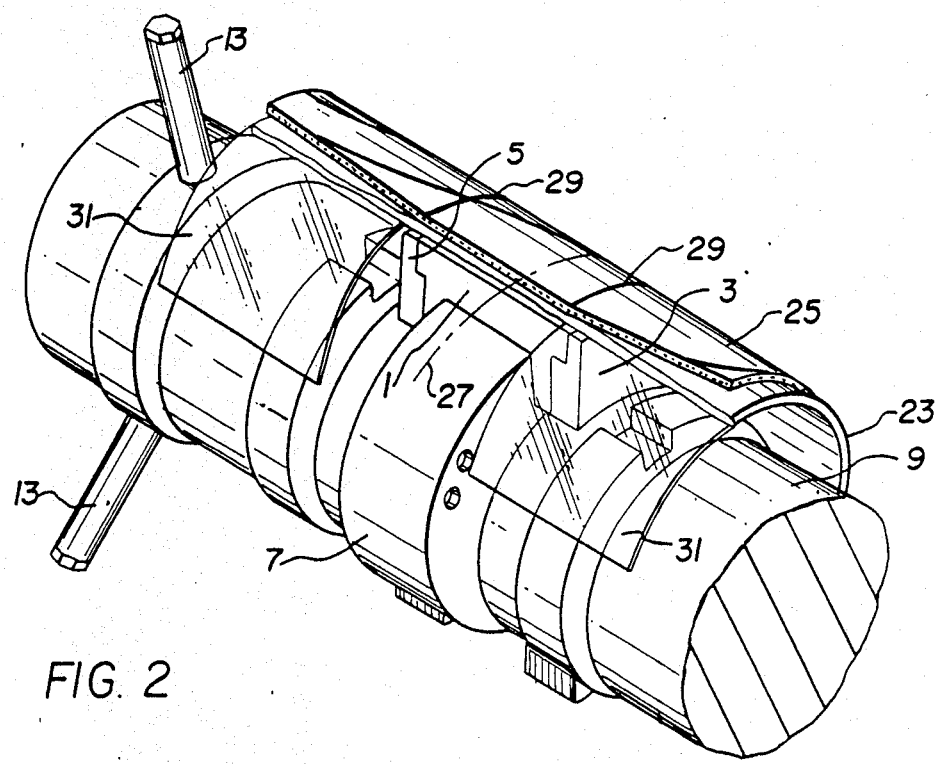
FIG. 2 illustrates how the first two body plies of the split air brake are laid up on the mold half of FIG. 1.

As seen best in FIGS. 1 and 2, a splined arcuate mold half 1 and arcuate mold end plates 3 and 5 are secured to a radial rib 7 on the shaft 9 of a bladder building machine by bolts 11. Handles 13 provide means for rotating the shaft 9 to present a desired section of the mold during build up of the air brake. The splined mold half 1 and end plates 3 and 5 define pockets 15 which are filled with rubber to form mounting lugs 17 on the air brake for wear pads (not shown). Pins 19 are inserted transversely through the pockets to form bores 21 through the lugs 17 for mounting the wear pads.

A first flat body ply 23 of non-reinforced rubber is applied over and stitched to the lugs 17 with the sides of the first ply extending laterally beyond the sides of the lugs. A second, flat body ply 25 of fabric reinforced rubber is placed over and stitched to the first body ply with the nylon cords laying at a forty-five degree angle to the longitudinal axis 27 of the splined mold half 1. The lines 29 on the second body ply 25 are construction aids which indicate the cavity width and serve as placement markers for the next ply. Each of the body plies is provided with these markings. Polyethelene strips 31 are inserted between the first and second plies outside the cavity lines 29. This allows these areas to be worked individually later in the procedure and similar strips are provided between each of the plies.

Figure 3:
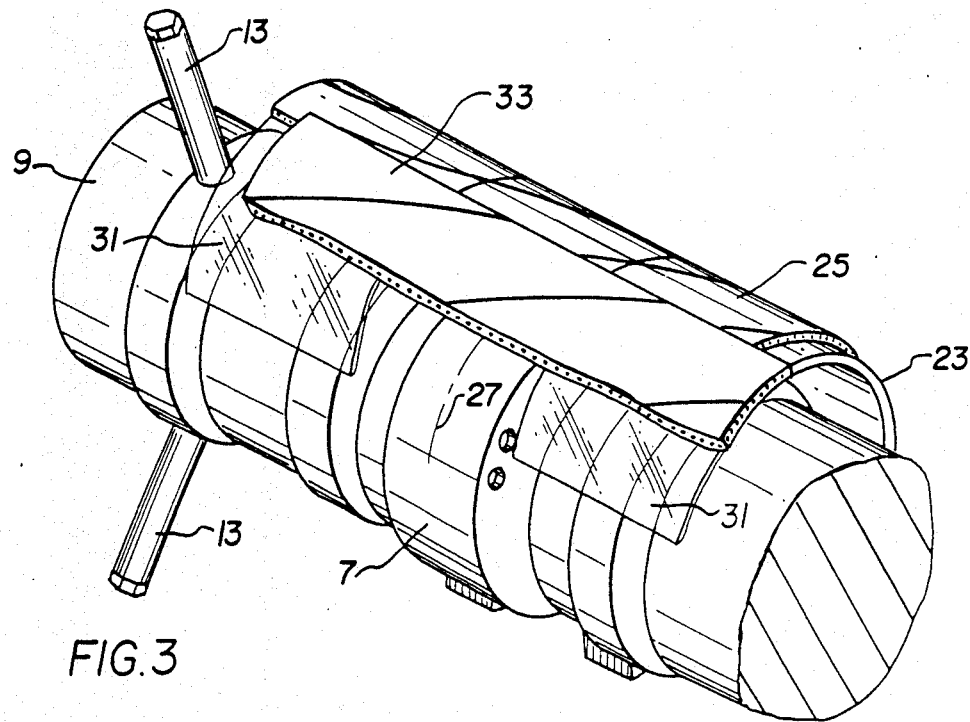
FIG. 3 illustrates the laying up of the first end patch on the body plies shown in FIG. 2.

As shown in FIG. 3, one of the first pair of end patches 33 is applied over and stitched to each end of the second body ply 25. This pair of end patches is fabric reinforced with the cords laying at a forty-five degree angle to the longitudinal axis 27 of the splined mold half.

Figure 4:
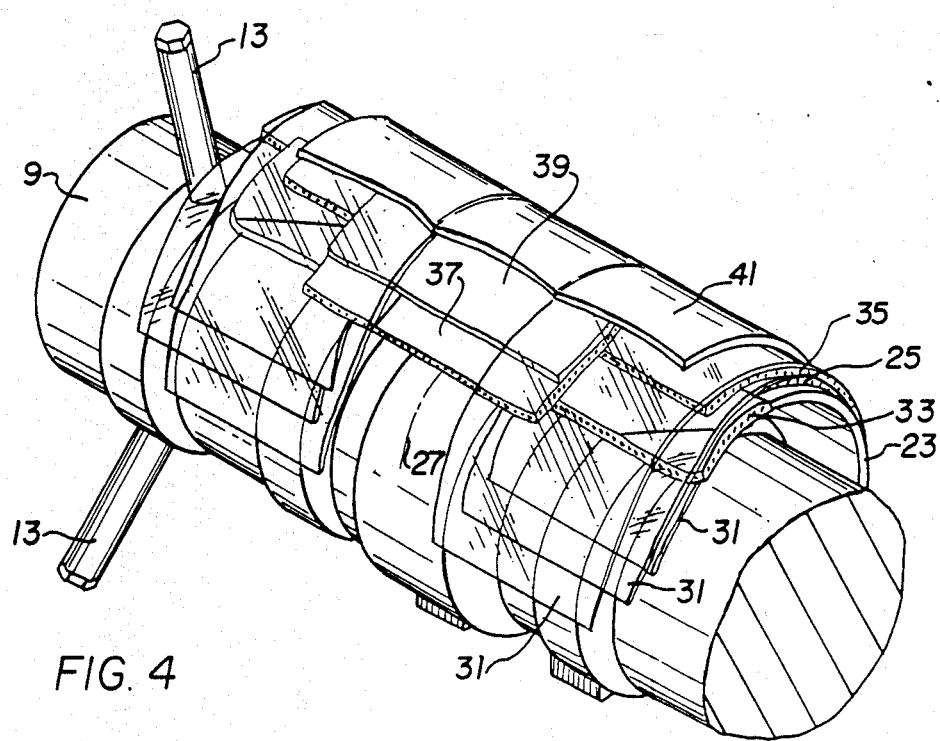
FIG. 4 illustrates the laying up of the remaining body plies and end patches.
Figure 5:
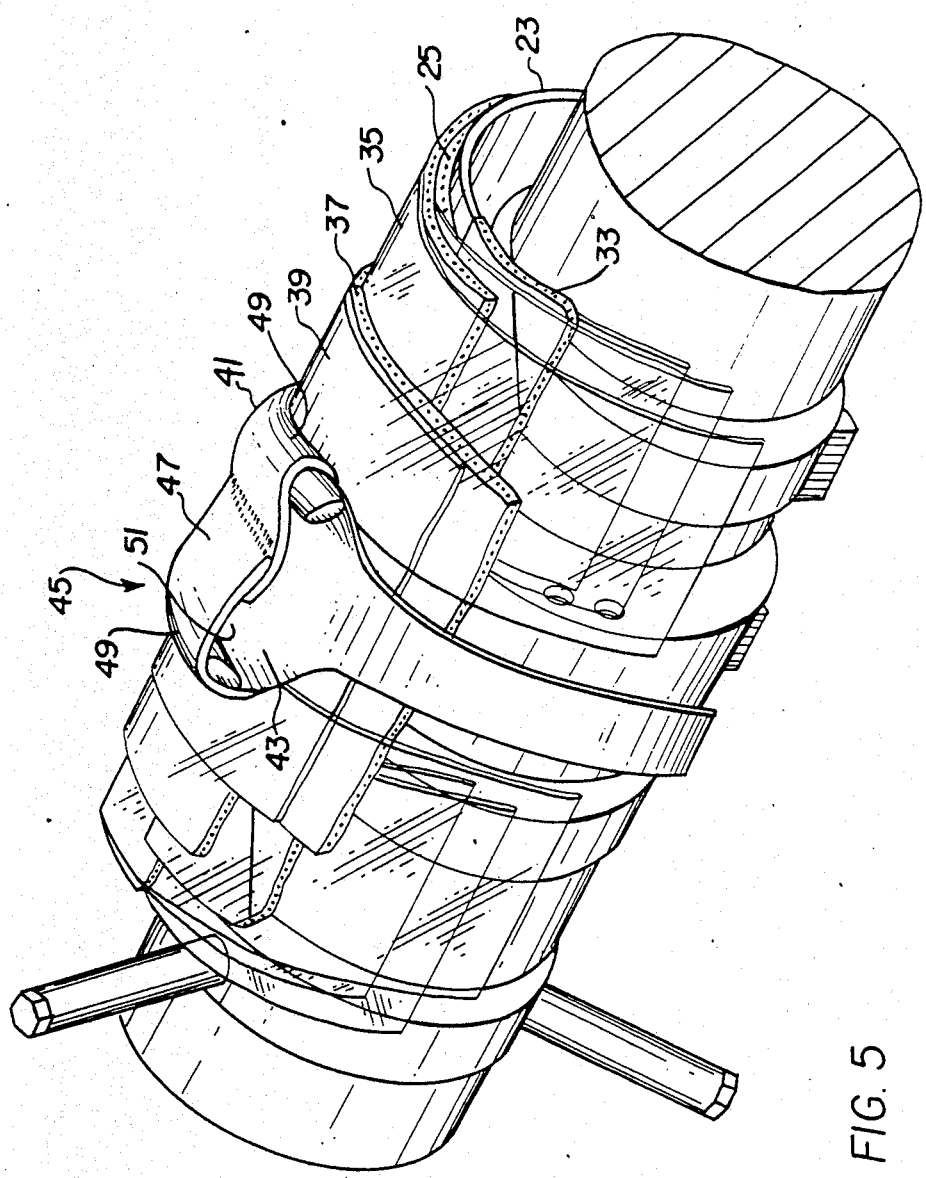
FIG. 5 illustrates how the top body ply is folded over a removable work surface to form the flattened tubular body of the split air brake.

Additional body plies and end patches are laid up in a similar manner. As can be seen from FIG. 4, a third body ply 35 is placed over the second body ply 25 and overlaps the first pair of end patches 33 so that the patches project longitudinally outward from between the second and third body plies. This third body ply 35 is fabric reinforced with the nylon cords oriented at a forty-five degree angle to the longitudinal axis 27 of the splined mold half 1 and at a ninety degree angle to the cords in the second ply 25.

Next, a second pair of end patches 37 is placed over and stitched to the ends of the third body ply 35. The patches are fabric reinforced with the cords running parallel to the longitudinal axis 27 of the splined mold half 1. Directly on top of the second pair of reinforced end patches, a third pair of non-reinforced rubber end patches 39 is placed. This pair of end patched initially forms the ends of the brake cavity and acts as a liner for the ends. A fourth body ply 41, of non-reinforced rubber, is placed over the other plies and the third pair of end patches 39 and is stitched in place.

With all of the materials in place, the air brake is now formed from the inside out. A removable work surface 43 is taped over the cavity area. The sides of the non-reinforced rubber fourth body ply 41 are folded over the removable work surface 43 and stitched in place to form a flattened tubular body 45 having two flat sides 47 and rounded side edges 49. The removable work surface 43 is pulled from the part leaving an open cavity 51 (see FIG. 6). A release agent is applied to the top surface of the fourth body ply 41 before it is folded over to prevent the inner surfaces of the open cavity from adhering to each other.

The integration of the non-reinforced rubber pair of third end patches 39 into the split air brake is shown schematically in FIGS. 6 through 10. In each of these figures, the "a" illustration is an end view, the "b" illustration is a front view and the "c" illustration is a side view. FIG. 6 shows the air brake construction with only the fourth body ply 41 which forms a liner folded to and stitched in place to form the basic shape of the flattened tubular body 45 with the open cavity 51. The patch 39 is folded substantially in half over the open cavity 51 in the direction of the arrows in FIGS. 6a and 6c. This results in the construction shown in FIG. 7 in which the patch 39 is folded down flat against the flat sides 47 of the flattened tubular body 45. With the patch 39 folded over the end of the cavity 51, it is, in effect, closed off and fully formed. As indicated in FIG. 7b, the patch 39 is wider than the flattened tubular body 45 and extends laterally beyond each of the rounded side edges 49.

To further secure the third end patch 39 in place, it must be plied into the sides of the flattened tubular body 45. As shown in FIG. 8, several cuts are made to facilitate this. Two cuts 53 are made inward from each side 55 of patch 39 to the rounded side edges 49 of the flattened tubular body 45. These cuts are aligned with the ends of the flat sides 47 to form at each side of the patch 39, a center flap 57 parallel to the end 59 of the flattened tubular body 45, and two side flaps 61 and 63 each adjacent and parallel to one of the flat sides 45. Additional cuts 65 are made to remove one of the side flaps, 61, from each side of the patch 39.

The center flaps 57 are folded downward as indicated by the arrows in FIG. 8b such that they extend longitudinally along the rounded side edges 49 of the flattened tubular body as shown in FIG. 9. The remaining side flaps 63 are then pulled, as shown by the arrows in FIG. 9a, circumferentially around the rounded side edges 49 of the flattened tubular body over the folded center flaps 57 and pressed in place. These side flaps 63 are stretched somewhat to add pressure to aid in removing any trapped air. The resultant sealed structure is shown in the views of FIG. 10.

The second pair of end patches is then built into the air brake as shown in FIGS. 11 through 14. Again, end, front and side views are shown in the "a", "b" and "c" illustrations of each figure. As indicated in FIG. 11c, the fabric end patch 37 is folded substantially in half over the end of the flattened tubular body 45 and against the flat sides 47 as shown in FIG. 12 in the same manner as the rubber patch 39. The sides 67 of the patch 37 also extend laterally beyond the rounded side edges 49 of the flattened tubular body 45. These extended side portions 67 are pinched together as indicated by the arrows in FIG. 12 to form the construction shown in FIG. 13. These pinched portions are then trimmed flush at the arrows shown in FIG. 13b to produce a smooth, sealed end reinforced by cords as shown in FIG. 14. It will be noticed that there is no overlap of portions of the fabric reinforced patch 37 which reduces the bulk of the end of the split air brake.

The third body ply 35 is then turned over the preformed flattened tubular body 45 reinforcing it and adding to the wall thickness. The third body ply 35 also overlaps the fabric reinforced second end patches 37 and thus carries the hoop loads generated by compressed air within the air brake so that the sides of the fabric reinforced patches do not have to resist these loads and can be constructed as discussed above.

Figure 15:
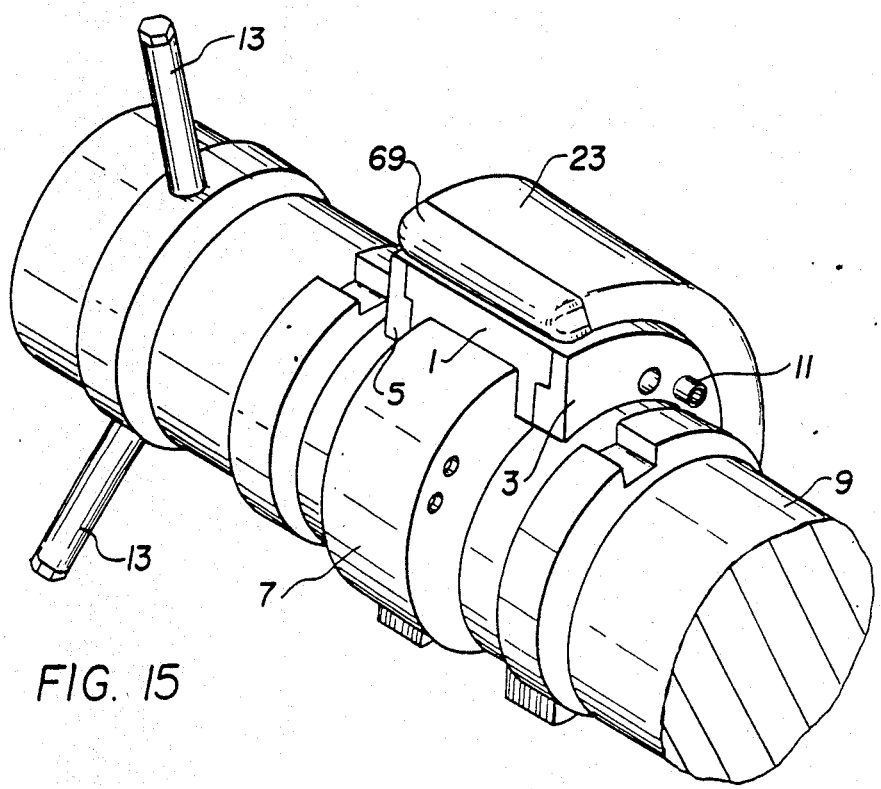
FIG. 15 is an isometric view of a built up split air brake prior to curing.

The first pair of fabric reinforced end patches 33 are then built into the air brake in the same manner as end patches 37. The second reinforced body ply 25 is folded around the flattened tubular body 45 and over the folded first end patches 33 and is stitched in place before the first unreinforced body ply 23 is similarly folded and stitched to add the final layer to the folded tubular body. Finally, an unreinforced rubber patch 69 is applied over the end patches 33 to provide material for molding a rubber outer surface on each end of the bladder. The assembled structure ready for curing is shown in FIG. 15.

Figure 16:
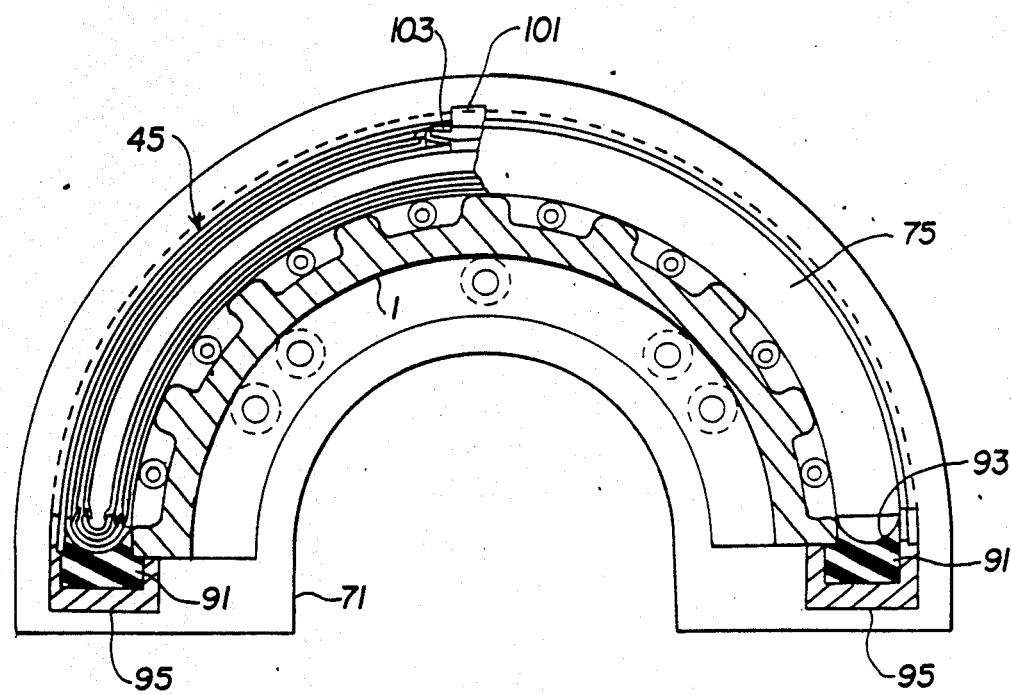
FIG. 16 is a horizontal section through a mold for curing the built up split air brake of FIG. 15 with some parts removed and the split air brake shown in longitudinal section with part removed.
Figure 17:
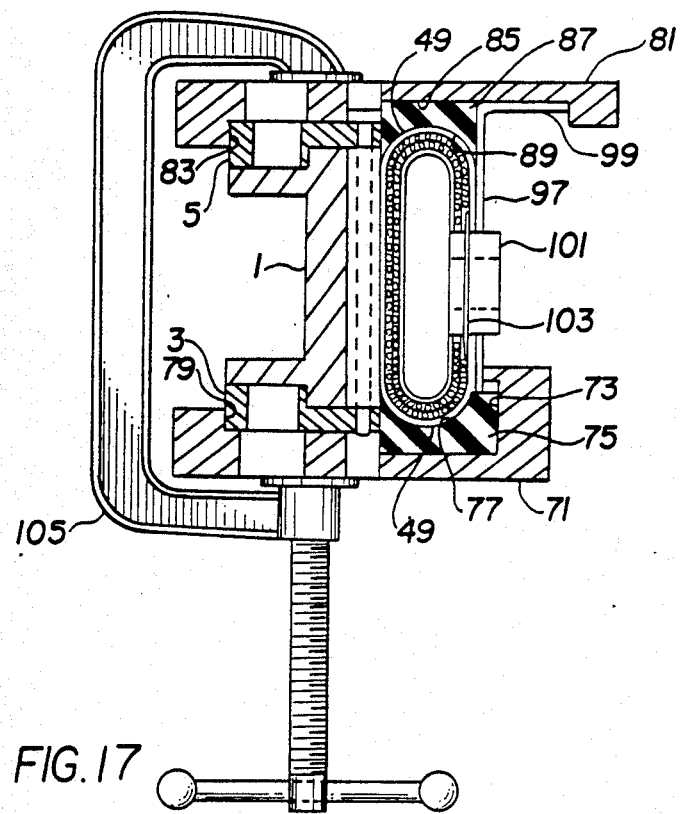
FIG. 17 is a section through the middle of the assembled mold with the built up split air brake in place.

The assembled split brake bladder is removed with the arcuate, splined half mold 1 and end plates 3 and 5 from the shaft of the bladder building machine for assembly of the remaining mold parts. As seen in FIGS. 16 and 17, the additional mold parts include an arcuate bottom plate 71 having groove 73 in which bottom rubber matrix 75 is inserted. The assembled split air brake is placed on its side on the bottom plate with one rounded side edge 49 in a semi-circular groove 77 of the bottom rubber matrix 75 and with one end plate 3 in a groove 79. A top mold plate 81 having a groove 83 which receives the end plate 5 and a groove 85 into which a top rubber matrix 87 is inserted, is placed over the upwardly directed rounded side edge 49 of the split air brake. The top rubber matrix 87 also has a semi-circular groove 89 which receives the rounded side edge. Rubber end matrices 91 having semi-circular grooves 93 which receive the ends of the split air brake, are supported at each end of the mold by end matrix retainers 95 which extend between the top and bottom mold plates 81 and 71 respectively.

An arcuate flanged backing plate 97 is placed in the mold against the convex side of the split air brake with the flange 99 received in the groove 85 in the top mold plate 81. This backing plate is bonded to the split air brake during curing and is used to mount the split air brake and to form a rigid outer shell which forces the split air brake to expand radially inward when compressed air is introduced into the cavity. The compressed air is introduced through an inlet 101 having a radial flange 103 which is worked into the body plies as the flattened tubular body is built up.

Figure 18:
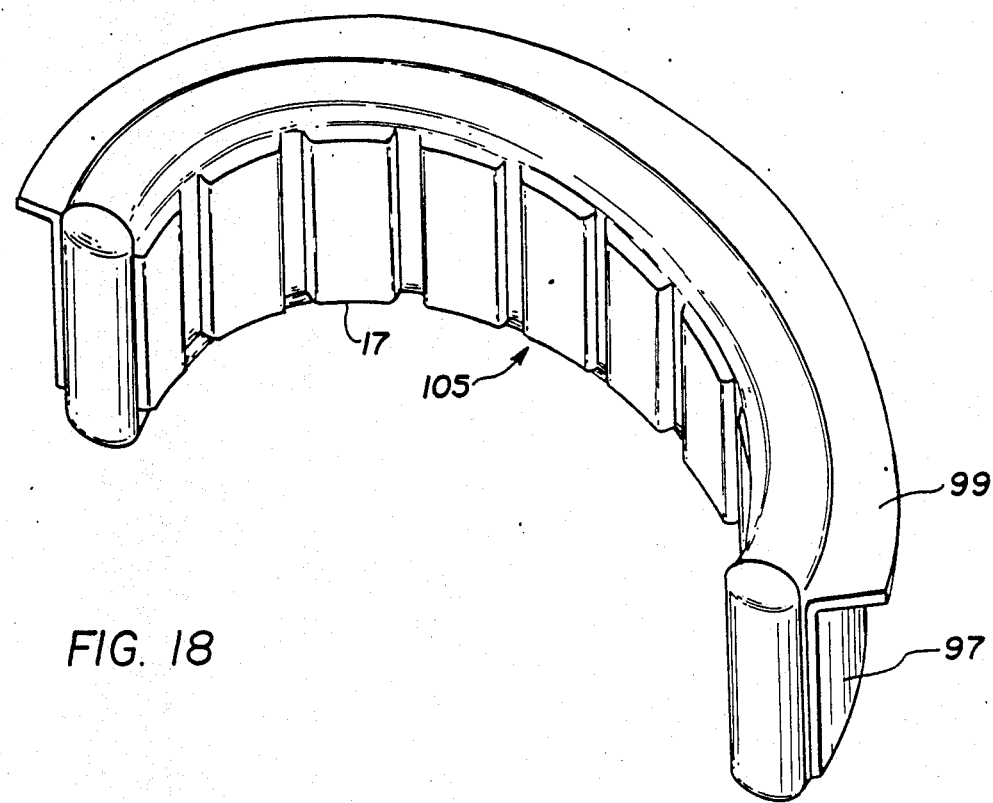
FIG. 18 is an isometric view of a finished split air brake in accordance with the invention.

The parts of the mold are locked together by C clamps 105 and the assembled mold is placed in a curing oven. Compressed air at 80 to 91 psi is applied to the chamber of the part via the inlet 101 during the curing operation. This aids in the part filling out the various shapes of the mold. The rubber matrices 75, 85 and 91 mold the side edges and ends of the split air brake to produce the finished product shown in FIG. 18. This finished product 105 has the backing plate bonded to its outer surface and integral, wear pad mounting lugs 17 on the inner surface. Two of these split air brakes are placed around a shaft to provide a brake in which the two halves can be separately replaced as the occasion arises without the need to pull the entire drum shaft, for instance on a tire building machine.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A reinforced rubber bladder comprising:
   a flattened tubular open-ended multi-layer body member formed from a plurality of rubber body plies, at least some of which are fabric reinforced, having two flat sides and two rounded side edges; and
   a fabric reinforced rubber end patch folded substantially in half over the full width of each open end of the flattened tubular body member between body plies with the halves of each patch pinched together at, and trimmed off along, the rounded side edges of the tubular body member without overlapping.

2. The bladder of claim 1 including additional fabric reinforced end patches folded over the full width of the ends of the flattened tubular body member between body plies and pinched at, and trimmed along, said rounded side edges without overlapping.

3. The bladder of claim 2 including unreinforced rubber end patches under the fabric reinforced end patches folded over the full width of each open end of the flattened tubular body member between body plies, with center flaps on the sides of said unreinforced rubber end patches in alignment with the ends of the flattened tubular body folded down along the rounded side edges of the tubular body, and with a side flap formed on each side of each folded, unreinforced end patch folded circumferentially around the flattened tubular body over the adjacent center flap to seal the ends of the flattened tubular body member.

4. A reinforced rubber half of a two-piece annular air brake comprising:
   a semi-circular flattened tubular body formed of a first outer body ply of unreinforced rubber, second and third fabric reinforced rubber intermediate body plies, and a fourth unreinforced rubber inner body ply, said flattened tubular body having two flat sides and rounded side edges and being curved in a plane transverse to the flat sides;
   a first pair of end patches of fabric reinforced rubber folded substantially in half, one over each end of the flattened tubular body between the second and third body plies, with each half of each first end patch folded flat against the flat sides of the second body ply and with each side of each first patch pinched together at, and trimmed along, the rounded side edges of the second body ply;
   a second pair of end patches of fabric reinforced rubber folded substantially in half, one over each end of said flattened tubular body between the third and fourth body plies, with each half of each second end patch folded flat over the flat sides of the fourth body ply and with each side of each second end patch pinched at, and trimmed along, the rounded side edges of the fourth body ply, and;
   a third pair of end patches of unreinforced rubber folded substantially in half, one over each end of the flattened tubular body between the third and fourth body plies and under the second pair of end patches, with each half of each patch folded flat against the flat sides of the fourth body ply, and with a center flap on each side of each third end patch in alignment with the associated end of the flattened tubular body folded down along the adjacent rounded side edge of the tubular body and with a side flap formed on each side of each third end patch folded circumferentially around the tubular body and over the adjacent center flap.

5. The air brake of claim 4 wherein the cords of the fabric in the first pair of fabric reinforced end patches are oriented at an angle to the direction of the cords in the second pair of fabric reinforced end patches.

6. The air brake of claim 5 wherein the cords of the second pair of fabric reinforced end patches are parallel to the longitudinal axis of the flattened tubular body.

7. The air brake of claim 4 including an additional pair of unreinforced end patches folded over the first pair of end patches and over the first body ply at each end of the semicircular flattened tubular body.

8. The air brake of claim 7 wherein the body plies and end patches are bonded into an integral rubber part with fabric reinforcement in the tubular body and the ends thereof by curing the rubber in the body plies and end patches.

9. The air brake of claim 8 wherein said semicircular, flattened tubular body has a convex flat side and including a rigid semicircular backing plate bonded to the convex flat side of the tubular body.

10. The air brake of claim 9 including an air inlet extending through the rigid backing plate and having a passageway therethrough which communicates with a cavity formed by the flattened tubular body.

11. A method of making a reinforced rubber bladder comprising steps of:
   forming from a plurality of rubber plies, at least some of which are fabric reinforced, a flattened tubular, open ended, multilayer body member, having two flat sides and rounded side edges;
   folding a fabric reinforced rubber end patch substantially in half over at least one open end of the flattened tubular body, with each half of said patch folded flat against one of said flat sides and extending laterally beyond each rounded side edge;
   pinching the two halves of said patch together where they extend laterally beyond each rounded side edge;
   trimming off the pinched portions of the end patch along said rounded side edges.

12. The method of claim 11 including the additional steps of:
   applying at least one more body ply to the tubular body and over the halves of said reinforced end patch which are folded against the flat sides of the flattened tubular body; and
   applying a second reinforced rubber end patch over said at least one more body ply by folding said second reinforced rubber end patch substantially in half over at least one end of the flattened tubular body, with each half of said patch folded flat against one of said flat sides and extending laterally beyond each rounded side edge;
   pinching the two halves of said patch together where they extend laterally beyond each rounded said edge;
   trimming off the pinched portions of the end patch along said rounded edges.

13. The method of claim 12 including the additional step of:
   applying at least one additional body ply to the tubular body over said at least one more body ply and over the halves of said second reinforced end patch which are folded against the flat sides of the flattened tubular body.

14. The method of claim 13 including the additional steps of:
   applying a non-reinforced rubber third end patch over the second reinforced end patch; and
   curing the resultant structure in a rubber lined mold to bond the body plies and end patches together to form an integral reinforced rubber bladder and to give the bladder the desired shape.

15. The method of claim 14 including the additional step of filling the bladder with a fluid under pressure for the curing step.

16. A method of making a fabric reinforced half of an annular air brake comprising the steps of:

laying up in order, one on top of the other on an arcuate mold half, a first planar body ply, a second planar body ply, a first pair of end patches, a third planar body ply, a second pair of end patches, a third pair of end patches and a fourth planar body ply, each pair of said patches extending longitudinally outward beyond the ends of said body plies, folding the sides of said fourth ply over each other and securing them together to form an open ended flattened tubular body, folding the third pair of end patches longitudinally over the open end of the tubular body formed by the folded fourth ply to close the same and sealing the sides of said folded patches around the tubular body, separately folding the second pair of end patches longitudinally over said third pair and sealing the sides of said second pair of folded patches, folding the sides of the third body ply over the tubular body and over the folded portions of the second and third pairs of end patches to add a second layer to the tubular body, folding the first pair of end patches inward longitudinally over the folded third ply, and sealing the sides of said first pair of folded patches, folding separately in succession, the sides of the second body ply and the sides of the first body ply to add layers to the tubular body, folding a sheet of rubber over each end of the tubular body to cover therewith the first end patches, and curing the tubular body with the covered ends.

17. The method of claim 16 wherein said first and second pairs of end patches are fabric reinforced rubber patches and wherein the sides of said patches when folded over the tubular body are sealed by pinching the folded layers together and trimming off the pinched material.

18. The method of claim 17 wherein said flattened tubular body defines two rounded edges between two flat sides, wherein said third pair of patches are unreinforced rubber patches and wherein each side of each of said third pair of patches is sealed by making two cuts inward from the side of the patch in alignment with the ends of the flat sides of the flattened tubular body to form a center flap and two end flaps, removing one of the end flaps, folding the center flap to extend longitudinally along the rounded side edge of the tubular body and folding the remaining end flap circumferentially around the tubular body over the folded center flap.

19. The method of claim 18 wherein said second and third body plies are fabric reinforced rubber and are laid up with the cords of the two plies at an angle to one another.

20. The method of claim 19 including securing the first body ply along a longitudinally extending center portion thereof to rubber blocks formed in the arcuate mold half and securing the remaining plies and patches to the ply below also along a longitudinal center portion as they are laid up.

21. The method of claim 20 including, prior to the curing step, the steps of assembling other mold parts around said tubular body and arcuate mold half to form an arcuate mold which curves in a plane transverse to the planes of said flat sides and at a curvature which shapes said tubular body into a semi-circular configuration.

22. The method of claim 20 including inflating said tubular body with a pressurized fluid for the curing step.

23. A method of sealing the end of a flattened tubular body having two flat sides joined by two rounded side edges constructed from at least one rubber body ply, said method comprising the steps of:

folding a rubber end patch substantially in half over the end of the flattened tubular body with each half of the patch flat against one of said flat sides, and with the patch extending laterally beyond the rounded edges of the flattened tubular body;

making two cuts inward from each side edge of the patch to the adjacent rounded side edge in alignment with the ends of said flat sides, to form at each side a center flap and two side flaps;

removing from each side of the patch one of the said flaps;

folding each center flap such that it extends longitudinally along the adjacent rounded side edge of the flattened tubular body;

folding each remaining side flap circumferentially around the flattened tubular body over the adjacent folded center flap; and curing the resultant construction to bond the patch to the flattened tubular body and to seal the seams formed by the folds.

24. The method of claim 23 including, prior to the curing step, the additional steps of:

folding another body ply around the flattened tubular body and over the rubber end patch to form another layer to the flattened tubular body;

folding a fabric reinforced end patch in half over the end of the rubber end patch with each half flat against the flat sides of the tubular body and extending laterally beyond each rounded side edge of the flattened tubular body;

pinching the two halves of the fabric reinforced patch together where they extend laterally beyond each rounded side edge of the flattened tubular body; and trimming off the pinched portions of the fabric reinforced patch along said rounded side edges.

25. The method of claim 24 including the additional steps before the curing step of:

applying additional body plies and at least one additional fabric reinforced end patch between body plies in the manner called for in claim 24; and applying another rubber end patch over all of the additional body plies and fabric reinforced end plies following the steps set forth in claim 23.

* * * * *

UNITED STATES PATENT AND TRADEMARK OFFICE
CERTIFICATE OF CORRECTION

PATENT NO. : 4,692,362

DATED : September 8, 1987

INVENTOR(S) : James L. Johnson

It is certified that error appears in the above-identified patent and that said Letters Patent is hereby corrected as shown below:

Column 1, line 53, change "pathes" to --patches--; column 3, line 9, change "molded" to --mold--; column 4, line 2, change "arc" to --are--; column 6, line 37, change "91" to --90--.

Signed and Sealed this

Twenty-second Day of March, 1988

*Attest:*

DONALD J. QUIGG

*Attesting Officer*     *Commissioner of Patents and Trademarks*